United States Patent
Krinsky et al.

(10) Patent No.: US 10,834,526 B2
(45) Date of Patent: *Nov. 10, 2020

(54) LATENCY REDUCTION AND RANGE EXTENSION SYSTEM FOR RADIO NETWORKS

(71) Applicants: AT&T Mobility II LLC, Atlanta, GA (US); AT&T INTELLECTUAL PROPERTY I, L.P., Atlanta, GA (US)

(72) Inventors: Jeffrey Krinsky, Redmond, WA (US); Bahman Khosravi-Sichani, Morganville, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,739

(22) Filed: Mar. 28, 2019

(65) Prior Publication Data

US 2019/0230463 A1    Jul. 25, 2019

Related U.S. Application Data

(63) Continuation of application No. 15/423,553, filed on Feb. 2, 2017, now Pat. No. 10,264,390, which is a
(Continued)

(51) Int. Cl.
*H04W 4/021*        (2018.01)
*H04L 1/00*         (2006.01)
(Continued)

(52) U.S. Cl.
CPC .......... *H04W 4/021* (2013.01); *H04L 1/0007* (2013.01); *H04L 1/0009* (2013.01);
(Continued)

(58) Field of Classification Search
None
See application file for complete search history.

(56) References Cited

U.S. PATENT DOCUMENTS

| 6,967,940 | B2 | 11/2005 | Marinier et al. |
| 7,346,349 | B2 | 3/2008 | Numminen et al. |
| (Continued) | | | |

FOREIGN PATENT DOCUMENTS

EP    1677557 A1    7/2006

OTHER PUBLICATIONS

Li, et. al. "Performance Evaluation of the Radio Link Control Protocol in 3G UMTS", published online at [http://citeseerx.ist.psu.edu/viewdoc/download?doi=10.1.1.118.2349&rep=rep1&type=pdf], retrieved Aug. 19, 2013, 8 pages.

(Continued)

*Primary Examiner* — Donald L Mills
(74) *Attorney, Agent, or Firm* — Amin, Turocy & Watson, LLP

(57) ABSTRACT

A radio access network system is described that determines a signal metric associated with a user equipment or device. The user equipment device can implement an altered transmission policy. The altered transmission policy can alter a strength of transmissions by increasing power consumption per transmission, increasing a length of timer per transmission, and altering other parameters of transmissions. The altered transmission policy can also alter an error correction policy. The error correction policy can indicate that error correction transmissions are to be decreased. The altered transmission policy can be implemented until the signal metric changes to a more desirable level.

20 Claims, 11 Drawing Sheets

Related U.S. Application Data continuation of application No. 14/073,845, filed on Nov. 6, 2013, now Pat. No. 9,564,986.

(51) Int. Cl.
*H04W 4/029* (2018.01)
*H04W 4/02* (2018.01)
*H04W 8/22* (2009.01)
*H04W 52/28* (2009.01)

(52) U.S. Cl.
CPC .......... *H04L 1/0041* (2013.01); *H04L 1/0061* (2013.01); *H04W 4/027* (2013.01); *H04W 4/029* (2018.02); *H04W 8/22* (2013.01); *H04W 52/283* (2013.01); *H04W 52/285* (2013.01)

(56) References Cited

U.S. PATENT DOCUMENTS

| | | | |
|---|---|---|---|
| 7,869,396 B2 | 1/2011 | Chun et al. | |
| 7,979,770 B2 | 7/2011 | Lohr et al. | |
| 8,090,826 B2* | 1/2012 | Tran | G06F 15/173 709/225 |
| 8,166,145 B2* | 4/2012 | Tran | G06Q 10/109 709/223 |
| 8,386,900 B2 | 2/2013 | Lohmar et al. | |
| 8,526,955 B2* | 9/2013 | Lin | H04W 64/006 342/352 |
| 8,655,307 B1* | 2/2014 | Walker | H04W 72/0493 455/405 |
| 8,904,044 B2* | 12/2014 | Ebling | G06F 15/16 600/300 |
| 9,066,230 B1 | 6/2015 | Paczkowski et al. | |
| 9,564,986 B2* | 2/2017 | Krinsky | H04L 1/0007 |
| 10,264,390 B2* | 4/2019 | Krinsky | H04L 1/0007 |
| 2002/0012359 A1 | 1/2002 | Kikuchi et al. | |
| 2003/0137966 A1* | 7/2003 | Odman | H04L 1/0001 370/347 |
| 2005/0220019 A1 | 10/2005 | Melpignano | |
| 2007/0077952 A1 | 4/2007 | Sartori et al. | |
| 2007/0177558 A1 | 8/2007 | Ayachitula et al. | |
| 2008/0095120 A1* | 4/2008 | Hong | H04W 36/24 370/332 |
| 2009/0113232 A1 | 4/2009 | Park et al. | |
| 2009/0310501 A1* | 12/2009 | Catovic | H04W 24/08 370/252 |
| 2010/0002692 A1 | 1/2010 | Bims | |
| 2011/0053513 A1 | 3/2011 | Papakostas et al. | |
| 2011/0113299 A1 | 5/2011 | Power et al. | |
| 2011/0143748 A1 | 6/2011 | Shah et al. | |
| 2011/0216712 A1 | 9/2011 | Yang et al. | |
| 2012/0270564 A1 | 10/2012 | Gum et al. | |
| 2012/0300699 A1 | 11/2012 | Kamuf et al. | |
| 2012/0320733 A1 | 12/2012 | Zhao et al. | |
| 2013/0021969 A1 | 1/2013 | Ho et al. | |
| 2013/0084865 A1 | 4/2013 | Agrawal et al. | |
| 2013/0163536 A1 | 6/2013 | Anderson et al. | |
| 2013/0195031 A1 | 8/2013 | Hessler et al. | |
| 2013/0244673 A1 | 9/2013 | Anand et al. | |
| 2014/0105083 A1* | 4/2014 | Krishnaswamy | H04W 40/22 370/311 |
| 2014/0323056 A1* | 10/2014 | Carbajal | H04W 24/08 455/67.11 |
| 2014/0328193 A1* | 11/2014 | Horn | H04W 24/00 370/252 |
| 2015/0045028 A1* | 2/2015 | Singh | H04W 36/0094 455/436 |
| 2017/0063596 A1* | 3/2017 | Potkonjak | G06F 9/5011 |
| 2017/0150311 A1 | 5/2017 | Krinsky et al. | |

OTHER PUBLICATIONS

Xu, et al. "Performance Analysis on the Radio Link Control Protocol of UMTS System", Proceedings. IEEE Vehicular Technology Conference, 2002. vol. 4. pp. 2026-2030.

Office Action dated Jul. 29, 2015 for U.S. Appl. No. 14/073,845, 33 pages.

Office Action dated Jun. 1, 2016 for U.S. Appl. No. 14/073,845, 25 pages.

Office Action dated Jan. 29, 2016 for U.S. Appl. No. 14/073,845, 23 pages.

Office Action dated Apr. 17, 2018 for U.S. Appl. No. 15/423,553, 25 pages.

Office Action dated Jul. 24, 2018 for U.S. Appl. No. 15/423,553, 18 pages.

Office Action dated Sep. 15, 2017 for U.S. Appl. No. 15/423,553, 33 pages.

* cited by examiner

LATENCY REDUCTION AND RANGE EXTENSION SYSTEM FOR RADIO NETWORKS

CROSS-REFERENCE TO RELATED APPLICATIONS

The subject application is a continuation of, and claims priority to each of, U.S. patent application Ser. No. 15/423,553, entitled "LATENCY REDUCTION AND RANGE EXTENSION SYSTEM FOR RADIO NETWORKS," and filed on Feb. 2, 2017, and U.S. patent application Ser. No. 14/073,845 (now U.S. Pat. No. 9,564,986), entitled "LATENCY REDUCTION AND RANGE EXTENSION SYSTEM FOR RADIO NETWORKS," and filed on Nov. 6, 2013. The entireties of the above noted applications are hereby incorporated herein by reference.

TECHNICAL FIELD

The subject disclosure relates to wireless communications, and more specifically to a latency reduction and range extension system that reduces latency and extends a coverage range in a wireless network.

BACKGROUND

The wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls and poor communication have been blamed for user dissatisfaction. On the network side, wireless service providers are observing an exponential growth in mobile communications due to both an increase in consumer demand and commercial requirements. To ensure customer satisfaction, wireless service providers aim to deliver a high quality service at any location, to facilitate reliable and efficient mobile communications. Moreover, to improve wireless coverage and reduce dead zones, wireless service providers can typically add and/or replace front-end equipment to realize effective bandwidth increases.

Video streaming, data streaming, and broadband digital broadcast programming are increasing in popularity in wireless network applications. To support these wireless applications, wireless service providers provide systems that transmit data content as data packets. Data packets can be lost, corrupted, or out of order when received by a network device.

DETAILED DESCRIPTION

Figure 1:
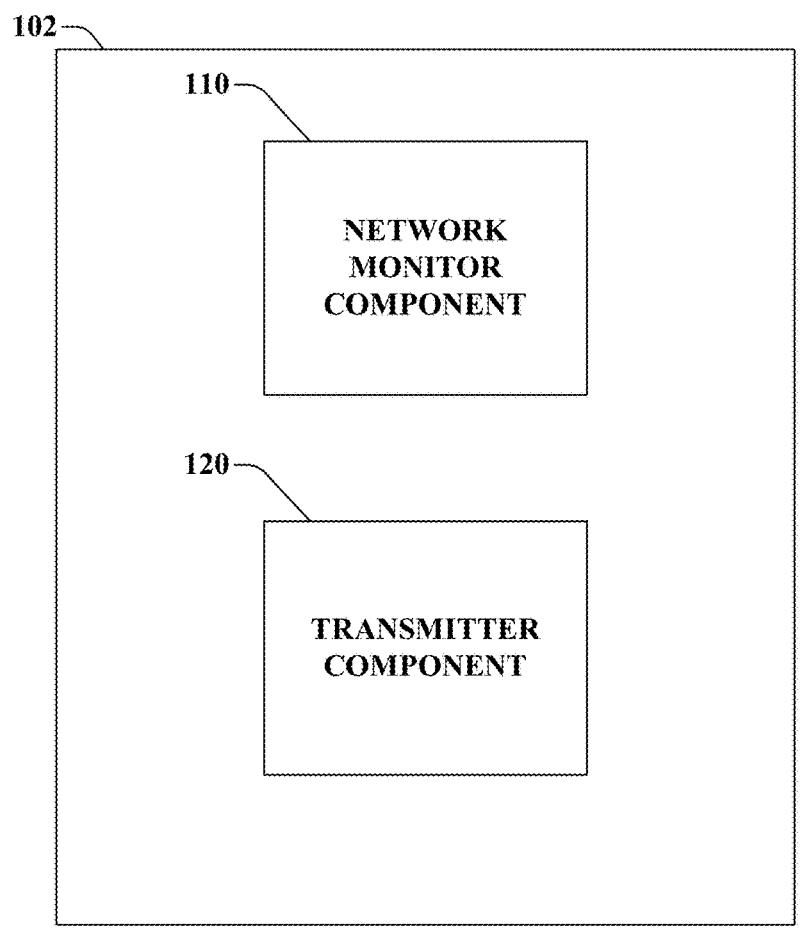
FIG. 1 is a block diagram illustrating an example, non-limiting embodiment of a latency reduction and range extension system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms "access point," "base station device," "site," and the like, are utilized interchangeably in the subject application, and refer to a wireless network component or appliance that serves and receives data, control, voice, video, sound, gaming, or substantially any data-stream or signaling-stream from a set of subscriber station devices. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms the terms "femtocell", "small cell", "pico", "pico cell" and "femto" are utilized interchangeably, while "macro cell" and "macro" are utilized interchangeably herein. It is noted that various other types of cells can be utilized.

To alter a coverage of a network, a latency reduction and range extension system is provided that alters transmissions policies. The system measures a signal metric of a radio access network. The system can alter, based on metric data representing the signal metric, policy data representing a transmission policy. It is noted that a transmission policy can comprise parameters for directing transmissions of a network device, such as voice transmissions, error correction transmissions, and the like.

Various embodiments disclosed herein relate to a latency reduction and range extension system that provides selective transmission and/or forward error frequency policies for a network device in a network. In some embodiments, the latency reduction and range extension system can utilize a geographic location to identify a location having a history of a signal metric meeting a defined criterion. The defined criterion can define a reduced signal metric, a compromised signal strength, or other quality assurance metric. A user equipment device entering the location associated with the history of the signal metric meeting the defined criterion can automatically alter transmission and/or error frequency policies without need to determine whether the signal metric meets the defined criterion. In another aspect, the latency reduction and range extension system can determine a route and geographic locations that a user equipment device is likely to travel based on input and/or a history of travel associated with the user equipment device. The latency reduction and range extension system can determine, based on the history of travel and history of the signal metric meeting a defined criterion, whether the user equipment device is likely to be in an a geographical associated with a reduced signal metric.

In other embodiments, a network device can implement a transmission and/or error correction policy based on the signal metric and/or geographic location. In an aspect, a network device can alter a transmission parameter (e.g., utilize more power per transmissions) and instruct an associated network device to alter the transmission parameter. It is noted that in some implementations, a power limit can constrain a maximum available power per transmission, and a length of time and/or number of bits per data packet can be altered and/or a length of time and/or number of bits per error correction packet can be altered. In another aspect, an altered transmission can result in a reduced need for packet re-transmissions as fewer packets are lost and/or corrupted. In an aspect, the network device can decrease a data rate (e.g., bandwidth) in exchange for increased reliability associated with a network coverage.

For these as well as other considerations, in one or more embodiments, a system includes a memory to store instructions and a processor, coupled to the memory to facilitate execution of the instructions to perform operations including signal metric and altering transmission and/or error correction policies. The operations also include determining whether the signal metric satisfies a defined criterion, wherein the defined criterion relates to a signal quality defining a reduced signal performance. The operations further include determining a geographic location, based on the signal metric, associated with a reduced signal performance.

Aspects or features of the subject specification can be exploited in substantially any wireless communication technology; e.g., Wi-Fi, Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Fourth Generation (4G) LTE, Third Generation Partnership Project 2 (3GPP2) Ultra Mobile Broadband (UMB), High Speed Packet Access (HSPA), Zigbee or another IEEE 802.XX technology. Additionally, substantially all aspects of the subject specification can be exploited in legacy telecommunication technologies and emerging telecommunication technologies. It is noted that all or some aspects of the subject specification can be exploited through modifications to legacy telecommunication systems. It is further noted that aspects of the subject specification can be applied to other forms of communications such as free space, wire lined (optical, fiber, etc), hybrid communication networks, and the like.

Turning now to FIG. 1, illustrated is an example, non-limiting embodiment of a system 100 in accordance with various aspects described herein. System 100 includes a network device 102 that can primarily include a network monitor component 110 (which can monitor a signal metric) and a transmitter component 120 (which can implement transmission and/or error policies based on metric data representing the signal metric). Network device 102 can include, for example, a user equipment device, a base station device, a network node, an access point, and the like. In an aspect, a user equipment device can be a personal data assistant, cellular phone, watch, tablet computer, laptop computer, global positioning system, tracking device, medical devices, and the like.

It is to be appreciated that while FIG. 1 shows network device 102 comprising network monitor component 110 and transmitter component 120, however the components can be on separated devices. It is further noted that network device component 102 can comprise additional components, including a non-transitory computer readable medium storing computer-executable instructions and/or a processor. In an aspect, the instructions, in response to execution by the processor, cause system 100 to perform operations.

In embodiments, the network device 102 can communicate with various other network devices utilizing a radio access network (e.g., 4G LTE). The network device 102 can send and receive data utilizing various connection schemes. For example, the network device 102 can send and/or receive packeted data in the form of data packets. The data packets can comprise control information (e.g., error correction data) and payload data (e.g., application data).

The network monitor component 110 can monitor, based on various measurements, a signal metric of the radio access network associated with the network device 102. The signal metric can comprise call quality criterion, signal strength criterion, available access points, received transmissions indicating transmission failures, available bandwidth, and the like. For example, the network device 102 can determine a signal strength based on measurement data. It is noted that the network monitor component 110 can receive the measurement data from various network devices and/or gather the measurement data.

The transmitter component 120 can, based on input from the network monitor component 110, determine policy data representing a transmission policy and/or error correction policy. In an aspect, the transmitter component 120 can determine whether the signal metric meets a threshold defining a poor signal quality. For example, the transmitter component 120 can identify a weak signal based on the signal metric meeting a threshold defining a weak signal.

In embodiments, the transmitter component 120 can determine to utilize a transmission policy and/or error correction in response to the signal metric meeting a threshold. The transmission policy can alter an existing transmission policy, such that a quality metric of an associated transmission of the network device 102 is altered. It is noted that the transmission policy can comprise data indicating a length of time for transmissions, a power criterion for transmissions, a number of bits per transmissions, and the like. It is further noted that the error correction policy can include data indicating a number of forward error correction packets to send, a length of forward error correction packets, a number of error correction bits to send per packet, a frequency of error correction, and the like. In various embodiments, the transmission policy can comprise the error correction policy and unless context suggests otherwise, the term "transmission policy" generally comprises policy data describing an error correction policy.

The transmitter component 120 can direct transmissions based on data describing the transmission policy. The transmitter component 120 can implement the policies to, in response to determining the signal metric meets a threshold, alter transmission parameters such as to increase power and/or length of time per transmission or potion of the transmission, alter error correction transmissions, and the like. For example, transmitter component 120 can determine signal quality is at a level defining a low quality and can increase the power used for transmitting each packet. In an aspect, each transmission can utilize more power and can take more time but can also experience a decreased negative quality (e.g., corruption and/or lose of packet). It is noted that in some power limited environments, power can only be increased to a certain level, after which other technique can be used for example increasing an energy per bit to noise power spectral density ratio ($E_b/N_o$) by reducing the bits/Hertz, increasing the Forward Error Correcting coding rates, using more robust Forward Error Correcting codes, altering packet length (e.g., shorter packets), altering a number of parity bits, altering a number of bits per symbol, or a combination of the above.

The decreased negative quality can decrease a need to provide error correction transmissions and/or decrease disruptions of transmissions (e.g., dropped calls, failed text/data transmissions, dropped packets, etc.). In embodiments, the transmitter component 120 can, in response to the determining the signal metric meets a threshold and/or in response to altering the transmission scheme, can implement the error correction policy. For example, as the transmission policy is altered to produce reliable transmissions, the error correction scheme can comprise data indicated that a number of error correction packets should be reduced. As another example, in system 100, the network device 102 can send four copies of each transmissions (e.g., error correction packets) and, in response to determining the signal metric meets a threshold, can reduce the number of copies to one copy of each transmission. It is noted that above example, is for illustrative purposes. As such, network device 102 can determine to send any number of copies, partial copies, and the like.

In another aspect, network monitor component 110 can, in response to determining a signal metric is not defined as a poor signal metric, instruct the transmitter component 120 to alter the policy to a standard policy. A standard policy can comprise instructions for transmitting under a defined normal signal metric. For example, the network monitor component 110 can determine to implement a standard policy in response to determining that a signal is within a range defining an acceptable operating signal strength.

In some embodiments, the system 100 can reduce latency associated with transmissions. It is noted that latency can refer to a time required for a transmission or series of transmissions to be sent and received by one or more devices. In an aspect, network device 102 can transmit packets to another network device. If the other network device determines that a packet is corrupted and/or is received out of order, the other network device can respond with a signal indicating the packet needs to be resent. Resending the packet can increase latency and/or reduce a user's quality of experience. Altering the transmission scheme and/or error correction scheme can result in a decreased need to resend (retransmit) packets.

In another aspect, altering the transmission scheme can increase a range of wireless communication system (e.g., a coverage area). For example, near an edge(s) of a coverage area, reliable transmissions can be extended based on aspects described herein. It is noted, that in 4G Long Term Evolution communications an edge of a coverage area can be extended (extend the geographic coverage area, reduce interference, and the like) when, or even if handover was required. It is noted that geographic coverage is not only distance from (for example) a base station to a user equipment device, but can also include an ability to get thought interfering objects, or improve operation in marginal locations such as in a parking garage, upper floors of a building, or in a basement etc.

It is noted that altering a transmission policy can comprise altering data describing a transmission policy. In an aspect, data describing a transmission policy can be altered to a defined policy based on measurement data and/or based on a target improvement, a transmission policy can be selected from a set of stored transmission policies, and the like.

Figure 2:
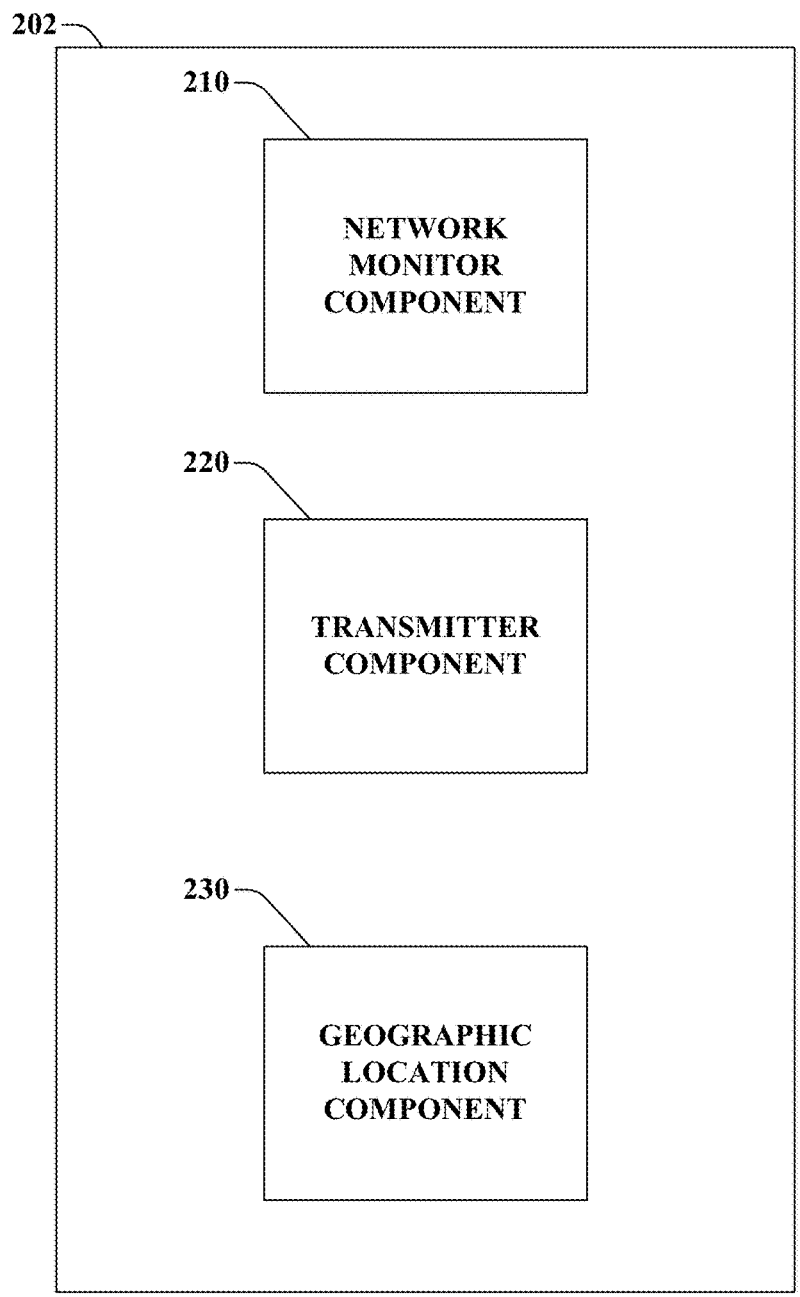
FIG. 2 is a block diagram illustrating an example, non-limiting embodiment of a latency reduction and range extension system including a geographic location component, in accordance with various aspects described herein.

Turning now to FIG. 2, illustrated is a block diagram illustrating an example, non-limiting embodiment of a latency reduction and range extension system 200. Latency reduction and range extension system 200 includes a network device 202 that can transmit signals to network devices within a coverage area of a network. The network device 202 can comprise a network monitor component 210 (which can monitor a signal metric) coupled to a transmitter component 220 (which can implement transmission and/or error policy based on the signal metric) and coupled to a geographic location component 230 (which can determine a geographic location).

The network monitor component 210 can monitor signal metrics of a network and the transmitter component 220 can, based on the signal metrics, implement determined transmission and/or error coding policies. In the embodiment shown in FIG. 2, geographic location component 230 can determine a geographic location representing a location of a network device (and/or a location likely to be the location) and associate the geographic location with signal metrics and/or transmission and error encoding policies. In an aspect, the geographic location component 230 can associate geographic locations and a signal metric determined to define a poor signal quality to indentify geographic locations that have a history of being associated with a criterion defining a poor signal metric. It is noted that geographic locations can be stored in a memory (e.g., a non-transitory computer readable medium) along with data indicating signal metrics associated with the geographic locations and data describing the network device 202 and/or a different network device. The transmitter component 220 can determine to alter the transmission policy based on a geographic location being associated with a poor signal metric (e.g., before a transmission metric meets a defined criterion such as a failed transmission). In response to determining the geographic location at or about a time that a network device determines that the signal metric meets a defined criterion, the transmitter component 220 can appropriately alter the transmission policy. In an aspect, transmitter component 220 can alter the transmission and/or error correction policy without network monitor component 210 providing network measurements.

In embodiments, the geographic location component 230 can determined a location through one or more techniques. As an example, the geographic location component 230 can utilize global satellite position data, accelerometer data, triangulation between access points, inertial navigation, timed difference of arrival navigation, angle of arrival, user input, identified networks (e.g., available internet connections, wireless fidelity networks, etc.), and the like.

In an aspect, the geographic location component 230 can determine any available method and/or technique to identify a geographic location. For example, the geographic location component 230 can determine if network device 202 has global positioning system capability and/or whether the global positioning system capability is active (e.g., turned on). In response to determining that global positioning system capability is available, geographic location component 230 can utilize global position system data. In response to determining that global positioning system capability is not available, geographic location component 230 can utilize another technique to determine a geographic location. In another embodiment, the geographic location component 230 can force a global positioning system capability to turn on and/or prompt a user to turn on the global positioning system capability.

In an embodiment, the geographic location component 230 can determine a location based on an accelerometer. For example, network component 202 can be a user equipment device. A user associated with the user equipment device can take a route to a destination. The accelerometer can determine a distance the user has traveled and can associate a period of the signal metric being defined as poor. The geographic location component 230 can store data describing a location, based on data from the accelerometer, and can determine the location is associated with an area of poor signal quality. For example, a user can take a specific route to work. At a certain location the user can experience poor signal quality. The geographic location component 230 can determine the location and instruct the transmitter component 220 to alter a transmission scheme and/or error correction scheme based on the location and/or a determined location likely to be the location in a future time.

In some embodiments, the geographic location component 230 can determine a location associated with a poor signal metric based on wireless access points. For example, the geographic location component 230 can determine a distance from a macro base station device (e.g., through triangulation or the like) and can define the location as being a location having a poor signal metric. In another aspect, the geographic location component 230 can determine a location based on availability of a wireless signal. For example, the geographic location component 230 can determine an available wireless signal (e.g., a user's home network, a network associate with a coffee shop along a user's route, a different user's network, etc.). The geographic location component 230 can determine an identifiable association between a poor signal metric and available wireless networks and/or a wireless network becoming unavailable. It is noted that geographic location component 230 can determine an identifiable association between a location, a signal metric, and unavailability of a wireless network. For example, geographic location component 230 can determine that a location has a poor signal metric based on a wireless network becoming unavailable. For context, a user associated with the network device 202 can be within range of a wireless network. The user can go out of range (e.g., in a parking garage) and the network device 202 can experience poor signal quality. The geographic location component 230 can associate the location with an area of poor signal quality.

It is noted that geographic location component 230 can determine the location based on a combination of one or more techniques described here. For example, geographic location component 230 can determine a distance from a wireless network based on availability of the wireless network and/or data from an accelerometer.

In some embodiments, geographic location component 230 can determine a location of a user equipment device, and can determine if the location is associated with a history of a signal metric meeting a defined criterion. In response to determining the location is associated with a history of the signal metric meeting the defined criterion, network monitor component 210 can actuate a network monitoring procedure to gather measured data and determine a signal metric. For example, a user equipment device can determine a location, and network device 202 can determine whether the location is associated with a history of a signal metric meeting a defined criterion. Accordingly, the network device 202 can avoid potentially unnecessary monitoring of a signal metric.

In embodiments, geographic location component 230 can receive data describing location information from other devices. Other devices can include a navigation system (e.g., of a car), an external global positioning system, and the like. As an example, a cellular phone can be within a faraday and/or partial faraday cage (e.g., a car). The geographic location component 230, within a cellular phone, can determine to utilize an external device to receive information such as an automobile's navigation system.

It is noted that the geographic location component 230 can apply a threshold to determine whether to associate a geographic location with an area of poor signal quality. The threshold can comprise a number of times a location has been associated with the signal metric meeting a defined criterion, a frequency of occurrences, and the like. In an example, a network device (e.g., cellular phone, base station, etc.) can record the number of occurrences and when the number reaches the threshold, geographic location component 230 can associate the location with the poor signal metric. In another example, the network device 202 can be a base station device that can service multiple user equipment devices. The geographic location component 230 can record a number of occurrences for all user equipment devices and/or a set of user equipment devices. The set can include user equipment devices in a select group, such as cellular phones, tablets, laptop computers, make and model of user equipment devices, etc.

It is further noted that the geographic location component 230 can determine to update data describing geographic locations associated with poor signal metrics. For example, the geographic location component 230 can determine to update the data based on an occurrence of an event. An event can include user input, change in a network, passage of time, and the like.

In some embodiments, network monitor component 210 can determine whether an event is associated with a signal metric meeting a defined criterion. For example, network monitor component 210 can, in response to determining a signal metric meets a defined criterion, receive a location from geographic location component 230 and can aggregate information associated with the location. For example, network monitor component 210 can identify an event (e.g., sporting event, parade, etc.) based on information gathered from a source (e.g., the internet), user input, and the like.

In another aspect, the geographic location component 230 can determine whether network device 202 is no longer within a location associated with the signal metric meeting a defined criterion. In response to geographic location component 230 determining that network device 202 is no longer within the location, the transmitter component 220 can alter the schemes to standard schemes. In some embodiments, network monitor component 210 can, in response to determining the network device 202 is no longer in the location, determine if the signal metric is altered (e.g., whether a signal strength is increased and/or is anticipated to increase based on a history of increase).

Figure 3:
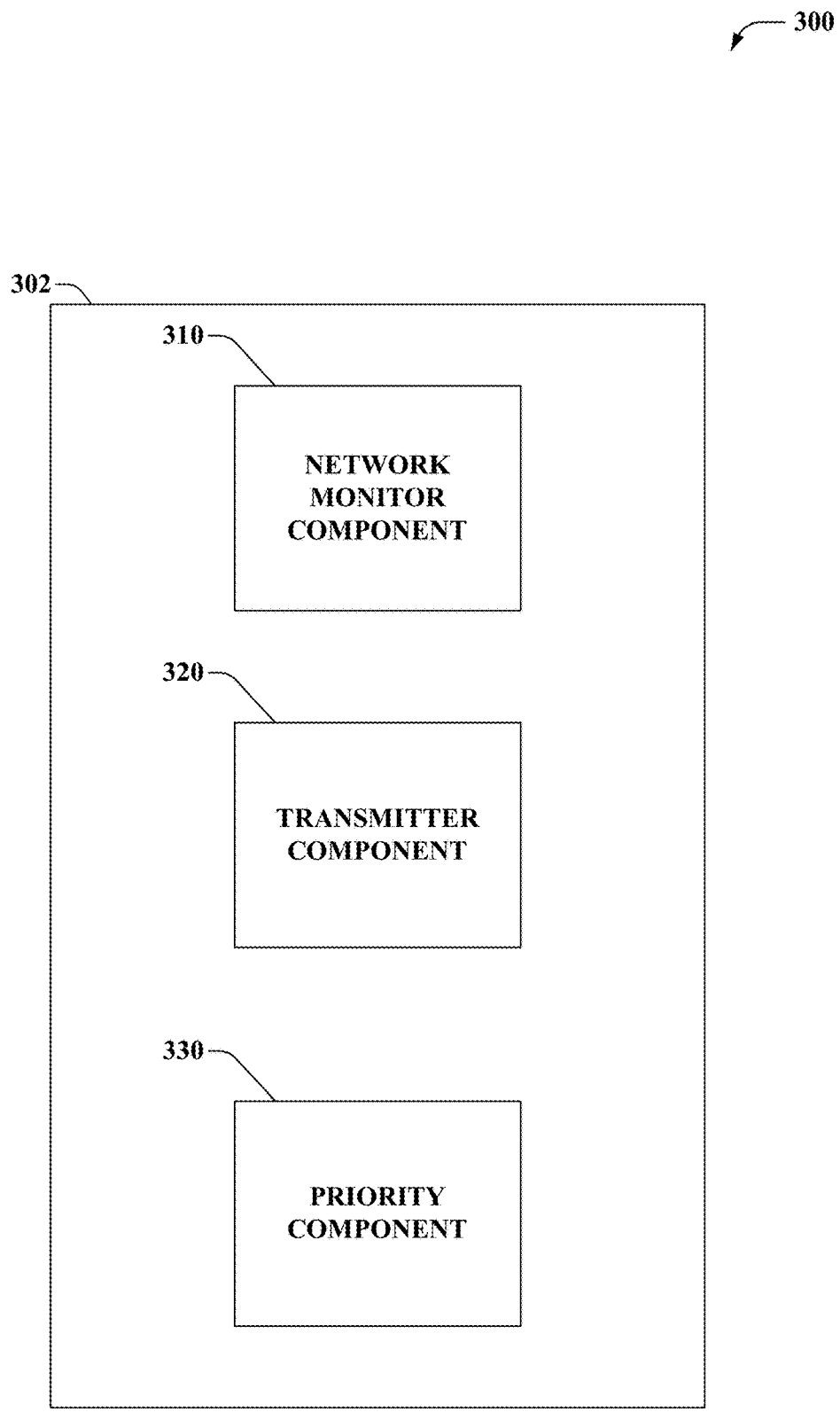
FIG. 3 is a block diagram illustrating an example, non-limiting embodiment of a latency reduction and range extension system including a priority component, in accordance with various aspects described herein.

Turning now to FIG. 3, illustrated is a block diagram illustrating an example, non-limiting embodiment of a latency reduction and range extension system 300. Latency reduction and range extension system 300 includes a network device 302 that can transmit signals to network devices within a coverage area of a network. The network device 302 can comprise a network monitor component 310 (which can monitor a signal metric) coupled to a transmitter component 320 (which can implement transmission and/or error scheme based on the signal metric) and coupled to a priority component 330 (which can determine a priority associated with a network device). It is noted that system 300 can comprise functionality described with reference to FIGS. 1 and 2.

Priority component 330 can determine a priority, for employing altered transmission and/or error schemes, associated with a user equipment device. The priority can comprise levels (e.g., high, middle, low, etc.), lists (e.g., 1, 2, . . . N, where N is a number), and the like. For example, a user equipment device having a high level can be associated with a higher priority. It is noted that priorities can be stored in a memory for future use.

In embodiments, priority component 330 can determine a priority based on user input, service agreements, user equipment device identification, data describing a user associated with a user equipment device, and the like. As an example, a device associated with a first responder can have a higher associated priority than a device associated with an average user. Priority component 330 can apply a determined priority to determine if a user equipment device is allowed to implement and/or continue implementing a transmission and/or error-correcting scheme.

In an aspect, priority component 330 can determine network constraints and network conditions during a time period. Network constraints can include load across a network, a number of user equipment devices attempting to implement an altered schema, availability of network resources and the like. In response to determining network conditions are approaching a network constraint threshold (e.g., network is overloaded and/or near overloaded), priority component 330 can determine whether a user equipment device is allowed to implement a policy. For example, in a congested network, network resource can be scarce. A user equipment device implementing the policy can utilize bandwidth that may or may not be need for other users (who may or may not be utilizing the policy). As a result of giving one user equipment device permission to implement the policy, other user equipment devices can experience a drop in signal metric and/or unavailability of service. Priority component 330 can determine, based on a priority associated with the user equipment device, whether to allow the user equipment devices to utilize bandwidth required to implement the policy.

Figure 4:
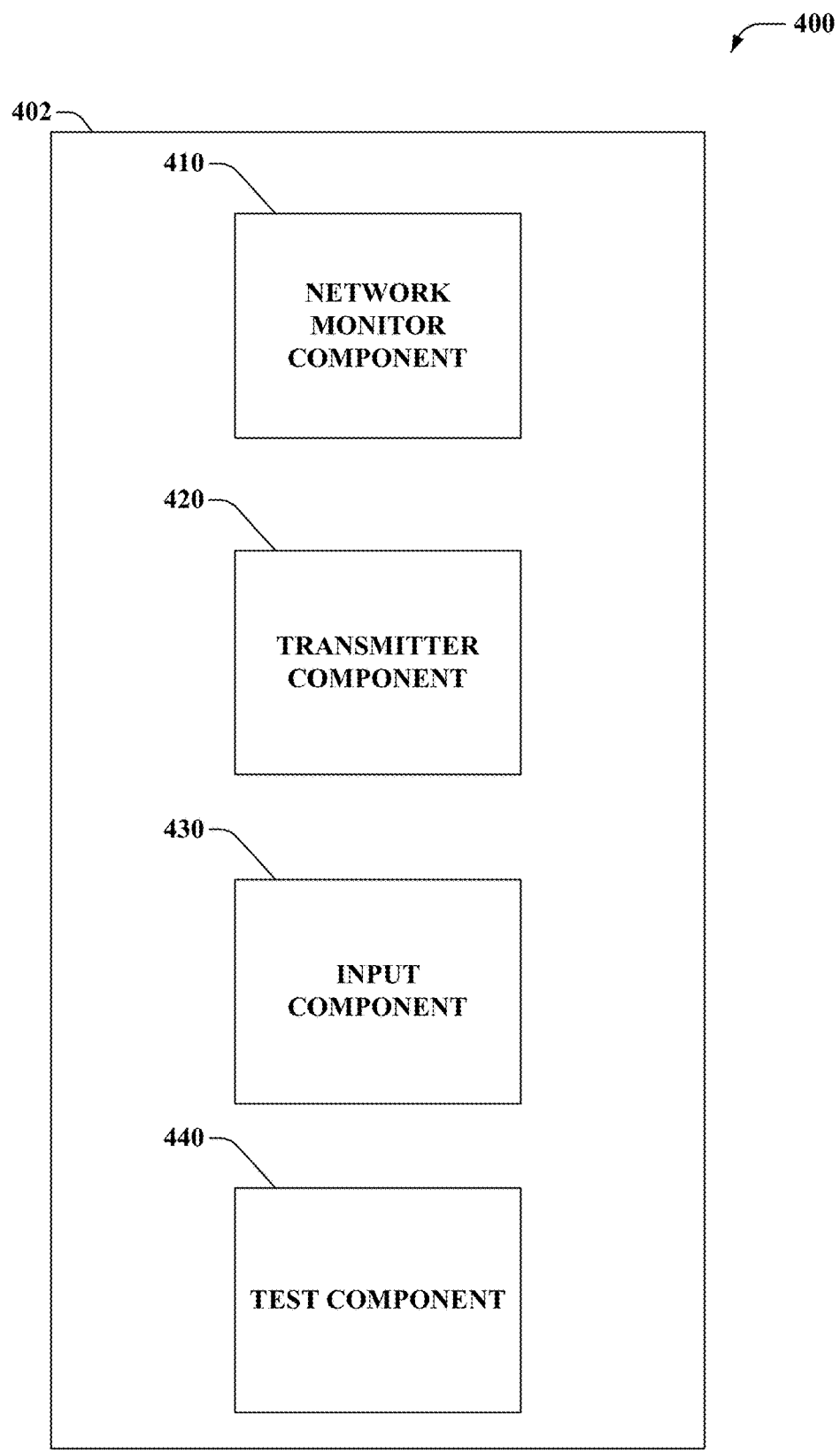
FIG. 4 is a block diagram illustrating an example, non-limiting embodiment of a latency reduction and range extension system including an input component, in accordance with various aspects described herein.

Turning now to FIG. 4, illustrated is a block diagram illustrating an example, non-limiting embodiment of a latency reduction and range extension system 400. System 400 primarily comprises network monitor component 410 (which can monitor signal metrics), transmitter component 420 (which can transmit data according to a transmission and/or error correction schema), input component 430 (e.g., which can receive data associated with user input), and test component 440 (which can determine whether an altered schema will improve a user experience). It is noted that system 300 can comprise functionality described with reference to FIGS. 1, 2, and 3.

Input component 430 can receive input from an end user. The end user can provide input via a user interface. Input can comprise data describing a desired setting associated with altering a transmission and/or error correction schema. For example, input component 430 can provide an interface (e.g., display on an interface, a button, and the like) for receiving input. In an aspect, input component 430 can prompt a user to select whether to activate the latency reduction and range extension system 400 when a signal metric falls below a threshold, whether to automatically alter schemes in the future, whether to disable the schemes on occurrence of an event (e.g., battery level below a certain threshold), whether to utilize a geographic location, and the like. In another aspect, input component 430 can receive input directing the transmitter component 420 to alter the transmission and/or error policy without regard to signal metrics (e.g., user forcing alteration). It is noted that input component 430 can store input associated with settings of a user equipment device, and can utilize the stored input to determine whether the user equipment device alters the transmission policy.

Test component 440 can determine a level of change of a signal metric associated with an altered transmission and/or error policy. A level of change can comprise a positive, negative, and/or no change. Test component 440 can determine the level based on measured data. For example, test component 440 can apply the policy to an initial sample set of transmissions and determine a level of change. In another aspect, test component 440 can determine a level based on a simulation of an alteration (e.g., as a function of data describing conditions, signal strengths, a history of data describing past simulations, device specific data, etc.), data describing the location (e.g., past levels associated with a location), user input, and the like.

In embodiments, test component 440 can output a level of change associated with a location and/or a user equipment device. Test component 440 can output the change, for example, to a memory for storage, to a user interface, and the like. In an aspect, test component 440 can determine whether a transmission schema should be implemented based on the level of improvement. In another aspect, a user can determine whether to allow alteration of the transmission schema based on an output associated with the level of change.

Figure 5:
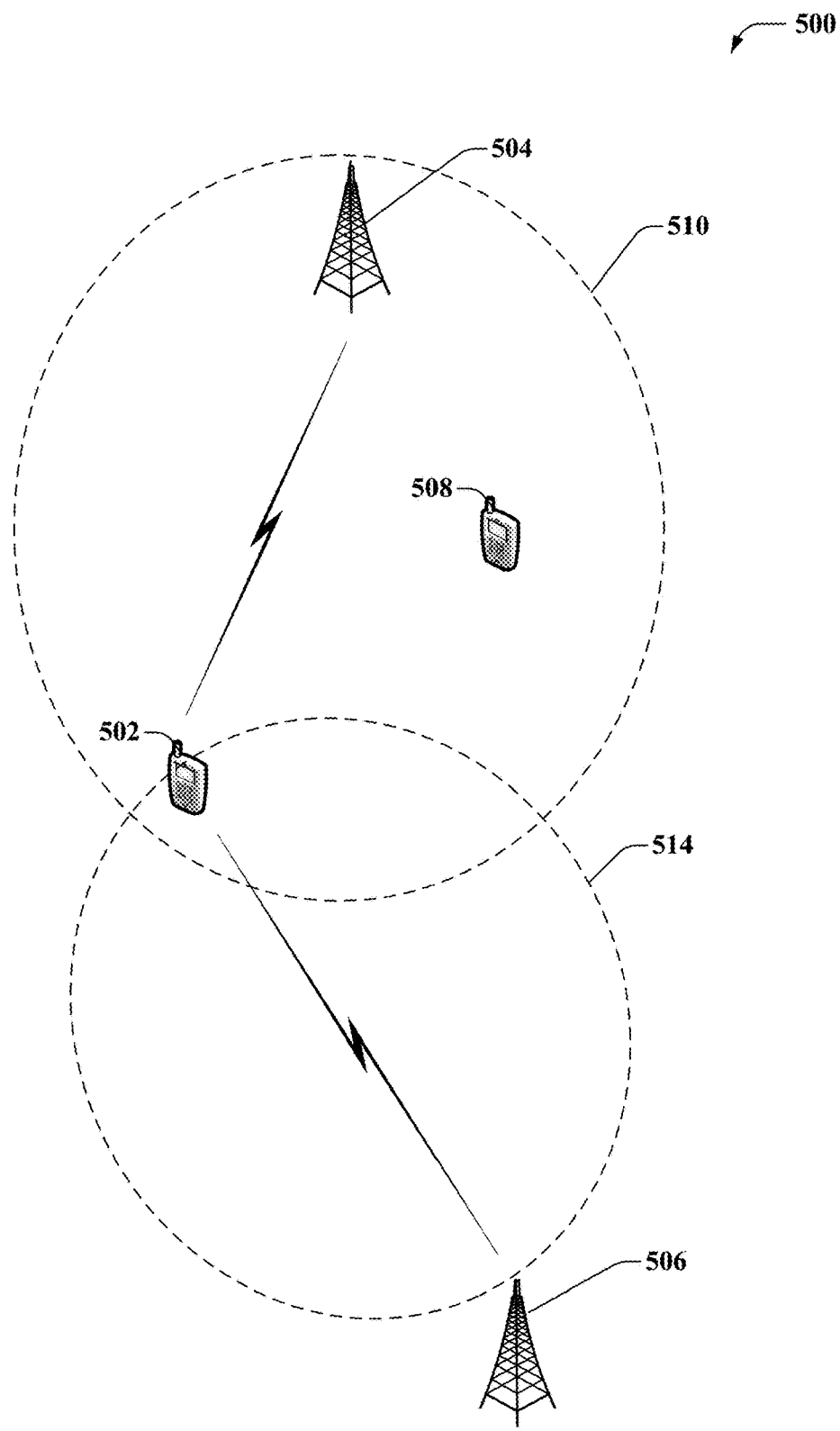
FIG. 5 is a block diagram illustrating an example, non-limiting embodiment of a latency reduction and range extension system in a network environment, in accordance with various aspects described herein.

FIG. 5, illustrates an example system 500 that can reduce latency of transmissions based on altered transmission policies, according to an aspect of the subject disclosure. System 500 comprises one or more macro cell(s), served by a base station device(s). Although only two macrocells 510, 514, served by their respective base station devices 504, 506, are illustrated it can be appreciated that the subject disclosure is not that limited and most any number of macrocells can be deployed within a network. In addition, although only two macro access point devices, namely base station device devices 504, 506, are illustrated, most any number of base station devices can be deployed within the system 500. It is further noted that base station devices 504, 506 can represent femto access points, and the like. System 500 can further comprise one or more user equipment devices 502, 508. Although only two user equipment devices 502, 508 are illustrated it can be appreciated that the subject disclosure is not that limited and most any number of user equipment devices can be deployed within a network. For sake of brevity, while one base station device, user equipment device, and/or macrocell may be referred to, it is noted that other base station devices, user equipment devices, and/or macrocells can function substantially similar, unless context suggests otherwise. It is noted that various aspects described as associated with a base station device are applicable to a user equipment device and vice versa.

Base station device 504 can comprise a base station device in a larger network (e.g., cellular network). Base station device 504 can provide service to user equipment device 502 and 508. Service can include providing network resources, transmitting data to/from devices, and the like. In an aspect, base station device 504 can comprise latency reduction and range extension systems such as, with reference to FIGS. 1-4, system 100, system 200, system 300, and system 400. User equipment device 502 can communicate with base station device 504 via a wireless connection. It is noted that user equipment device 502 can utilize various communication protocols.

User equipment device 502 can determine a signal metric associated with system 500. User equipment device 502 can further determine whether the signal metric is below a threshold level. In response to determining the signal metric is below the threshold level, user equipment device 502 can determine a transmission and/or error correction policy for transmissions associated with user equipment device 502. In an aspect, user equipment device 502 can communicate a result of the determining whether the signal metric is below the threshold level to base station device 504 or base station device 506. It is noted that user equipment device 502 can select which base station device 504 or base station device 506 to send the result to, based on a connection status associated with base station device 504 or 506. A connection status can comprise connected to, disconnected to, in transition to, etc. It is further noted that user equipment device 502 can send the result to both or neither of the base station devices 504 and 506. As an example, user equipment device 502 can implement the transmission/error correction policy and base station device 504 and/or 506 can determine whether user equipment device has altered the transmission/ error correction policy based on an analysis of the transmissions.

In embodiments, user equipment device 502 can determine a location and/or route of travel associated with a geographic position of user equipment device 502. User equipment device 502 can further determine if a location will likely result in an altered transmission policy based on stored data representing previous alterations and locations.

In response to determining that an alteration of the transmission policy is likely, user equipment device 502 can alter the transmission policy based on the location prior to the signal metric meeting a threshold level. It is noted that user equipment device 502 can determine whether alteration of the transmission policy is likely based on a history of data and a correlation between a history of alterations. It is further noted that user equipment device 502 can employ statistical models, Markov models, and the like to determine a correlation. In an aspect, a likelihood can be represented by a percentage, a defined level (e.g., high, medium, low), and the like.

Base station device 504 can determine whether to implement an altered transmission/error correction policy based on the result and/or based on data received from user equipment device 502. Base station device 504 can implement the altered transmission/error correction policy for user equipment device 502 while maintaining a normal or unaltered transmission policy associated with user equipment device 506.

In some embodiments, base station device 504 can determine a signal metric associated with user equipment device 502. Base station device 504 can further determine whether the signal metric is below a threshold level. In response to determining the signal metric is below the threshold level, base station device 504 can determine a transmission and/or error correction policy for transmissions associated with user equipment device 502. In an aspect, base station device 504 can communicate a result of the determining whether the signal metric is below the threshold level to user equipment device 502.

Base station device 504 can determine a location of user equipment device 502 associated with the altered transmission/error correction policy. For example, base station device 504 can receive a location from the user equipment device 502, determine a location based on triangulation, determine a location based on data describing available networks associated with user equipment device 502, and the like. In another aspect, base station device 504 can receive data describing user equipment device 502. Data describing user equipment device 502 can comprise data describing a make and model association with user equipment device 502, data describing an operating system association with user equipment device 502, data describing power levels of a battery or power component association with user equipment device 502, and the like.

In some embodiments, base station device 504 can store received data and location associated with an alteration of the transmission/error correction policy. Base station device 504 can compare the received data and location with previously stored data and locations to determine if the data and location are correlated with previous iterations of altered transmission/error correction policies associated with user equipment device 502 or other user equipment devices. Base station device 504 can utilize correlated iterations to determine whether an alteration of transmission/error correction policies should be performed as a user equipment device enters a location. In an aspect, based station device 504 can proactively alter transmission/error correction policies before a user equipment device experiences an alteration of a signal metric. It is noted that base station device 504 can make specific determinations for each user equipment device or for a set of user equipment devices.

Base station device 504 can utilize stored and received data to determine a probability of signal metric degradation for a location and/or user equipment device. In an aspect, base station device 504 can employ various models such as:

queuing models, Markov models, probabilistic functions of Markov chains, and the like—can subsequently perform probabilistic predictions based upon a collected history. For example, if prior iterations of altering transmission policies and/or error correction policies exist—base station device 504 can model the iterations and behavior of various user equipment devices and network metrics. In one aspect, the actual decision for which model to employ, can initially be based on a weighted average of user equipment specific data and location data—and subsequently modified when sufficient data is accumulated.

FIGS. 6-9 illustrate processes in connection with the aforementioned systems. The processes in FIGS. 6-9 can be implemented for example by systems 100, 200, 300, 400, and 500 illustrated in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
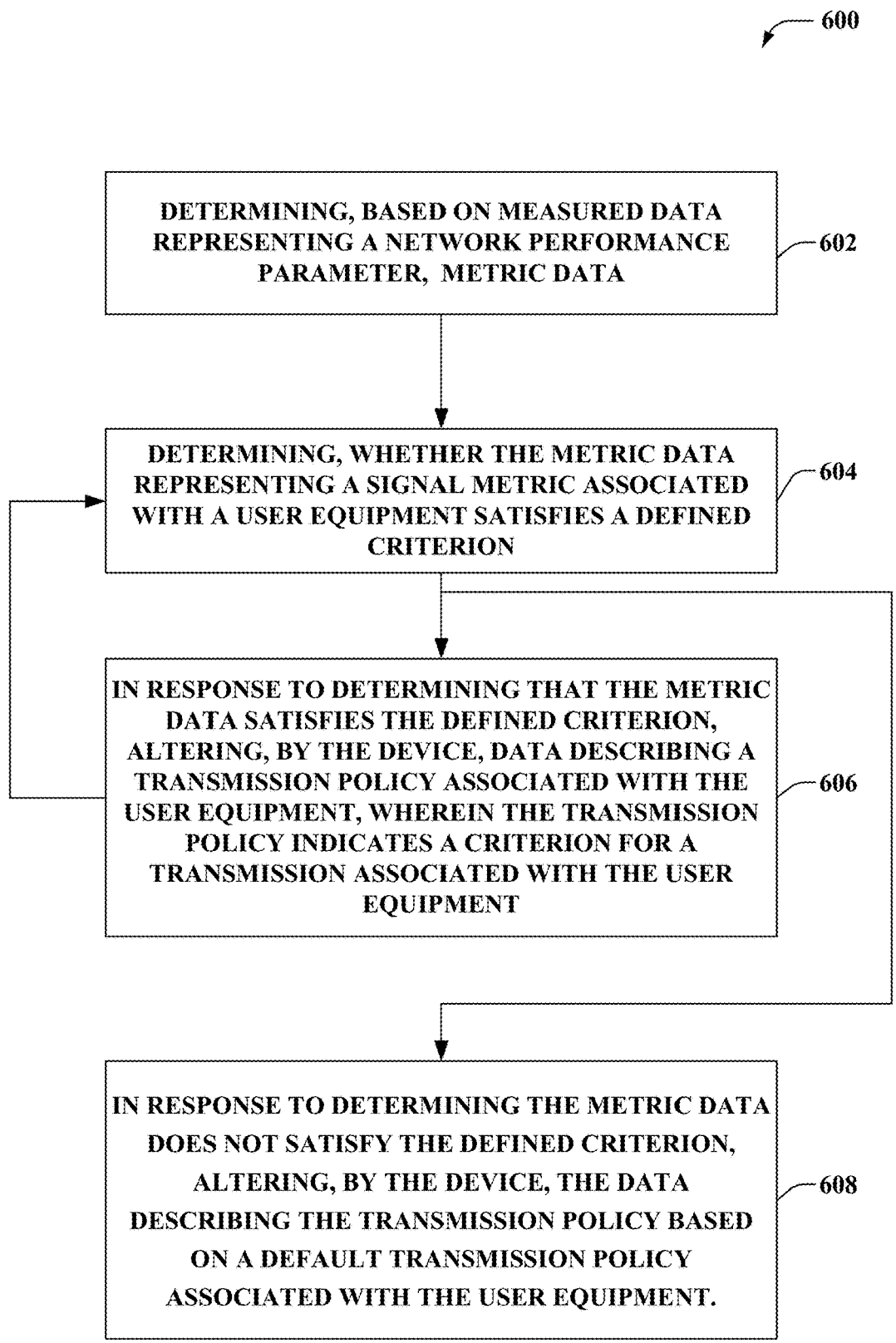
FIG. 6 illustrates a flow diagram of an example, non-limiting embodiment of a method for reducing latency in a system, as described herein.

FIG. 6 illustrates a flow diagram of an example, non-limiting embodiment of a method 600 for latency reduction based on altering a transmission policy as a function of a signal metric.

At 602, a system (e.g., system 100) comprising a processor can determine, based on measured data representing a network performance parameter, metric data. Metric data can comprise a signal strength, an error rate, a number of failed connection attempts, latency associated with transmissions, and the like. It is noted that measured data can be measured by a network device, such as a based station device or user equipment device. In another aspect, measured data can be received by the system.

At 604, a system can determine whether the metric data representing a signal metric associated with a user equipment satisfies a defined criterion (e.g., using network monitor component 110). The defined criterion can comprise a threshold level for the metric data. It is noted that the defined criterion can be predetermined in some embodiments, and dynamically determined in other embodiments. As an example, the defined criterion can comprise a threshold signal strength defining a degraded signal quality.

At 606, a system can, in response to determining that the metric data satisfies the defined criterion, alter (e.g., using transmitter component 120), data describing a transmission policy associated with the user equipment, wherein the transmission policy indicates a criterion for a transmission associated with the user equipment. The criterion for the transmission can comprise a power consumption associated with transmissions, a length of time associated with transmissions, a format for transmissions, a rate of error correction, a frequency of error correction, a number of error correction transmissions, and the like. As an example, the system can determine whether a signal strength meets a criterion defining a weak or compromised signal. In response, the system can alter a transmission policy such that each transmission is sent for a longer period of time and utilizes a greater amount of power in comparison to a non-altered transmission policy. It is noted that transmitter component 120 can alter the data describing the transmission policy and can facilitate implementation of the policy to alter transmissions.

In another aspect, the system can continue to determine whether the metric data associated with the user equipment device satisfies the defined criterion at 604. If the metric data does not satisfy the defined criterion then the transmission policy does not send transmissions via the altered transmission policy.

At 608, a system can, in response to determining the metric data does not satisfy the defined criterion, alter the data describing the transmission policy based on a default transmission policy associated with the user equipment. It is noted that if the transmission policy was not previously altered at 606, then the system does not alter the transmission policy at 608. For example, the system can determine that the policy should not be altered and can implement a standard transmission policy (e.g., a policy for normal signal strength).

Figure 7:
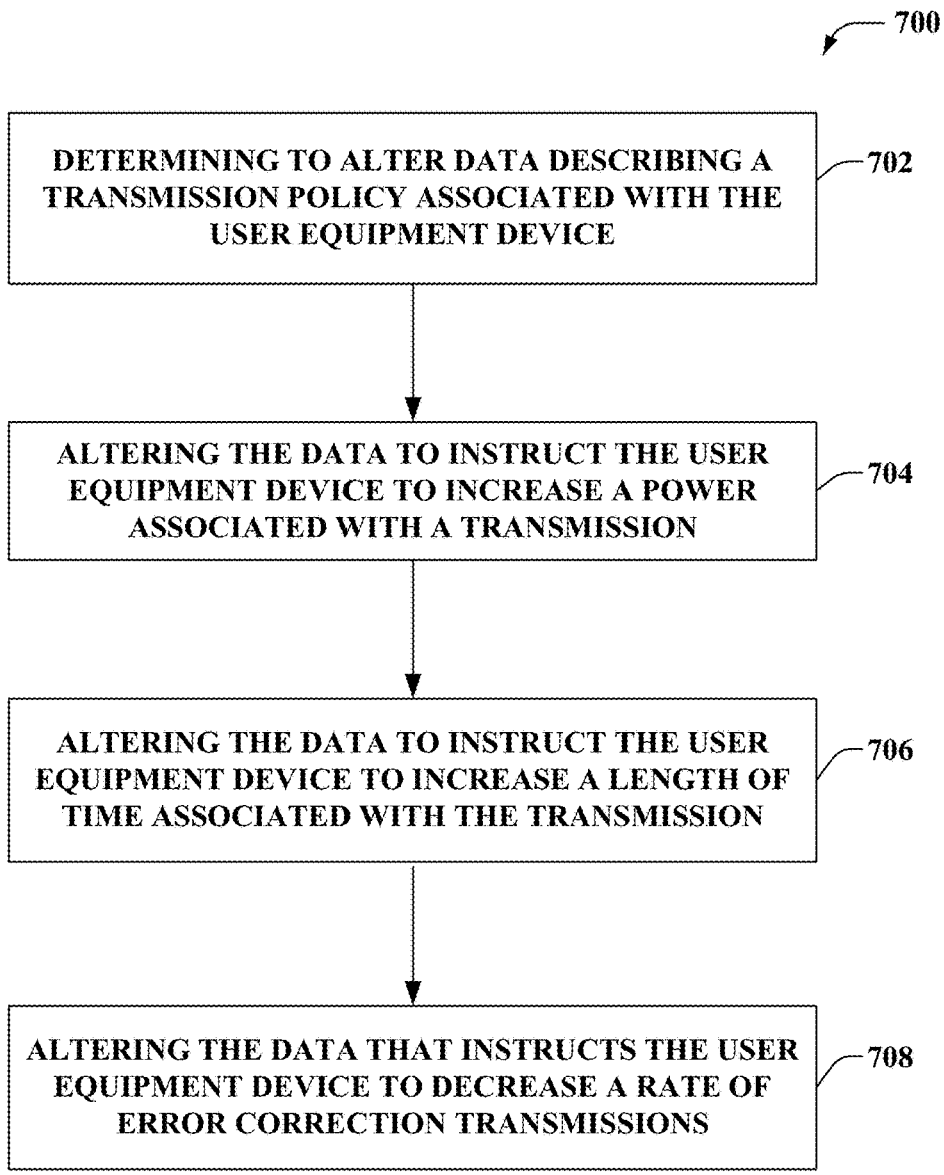
FIG. 7 illustrates a flow diagram of an example, non-limiting embodiment of a method for reducing latency in a system including altering transmission parameters, as described herein.

FIG. 7 illustrates a flow diagram of an example, non-limiting embodiment of a method 700 for latency reduction based on altering a transmission policy as a function of a signal metric, including altering data that instructs a user device to alter transmission parameters.

At 702, a system (e.g., using transmitter component 120) can determine to alter data describing a transmission policy associated with the user equipment device. In an aspect, the system can determine to alter the data based on measurement data, user input, and the like.

At 704, a system (e.g., using transmitter component 120) can alter the data to instruct the user equipment device to increase a power associated with a transmission. It is noted that the system can alter the data and implement the altered data to transmit information comprising data. For example, the system can determine to alter the data and implement the data to instruct a transmitter to transmit packeted data at an increased, with respect to prior transmissions, a power associated with transmissions.

At 706, a system (e.g., using transmitter component 120) can alter the data to instruct the user equipment device to increase a length of time associated with the transmission. The system can alter the data and implement the altered data to transmit information comprising data such that each transmission is transmitter for a longer period of time relative to a prior transmission. For example, the system can determine to alter the data and implement the data to instruct a transmitter to transmit each packet of data for an increased, with respect to a prior transmission, a length of time associated with transmissions. It is noted that each transmission occurring after the altering can transmit for a determine time period or can transmit for multiple relative time periods.

At 708, a system (e.g., using transmitter component 120) can alter the data that instructs the user equipment device to decrease a rate of error correction transmissions. In an aspect, a system can transmit error correction transmissions according to a first transmission policy, and in response to the altering of the data, can transmit error correction transmissions according to a second transmission policy. In an aspect, a frequency or rate of error transmissions can be decreased, with respect to the first transmission policy, for the second transmission policy. For example, in a second transmission policy, transmissions can be sent at a greater power for a greater length of time, in comparison to transmissions sent according to a first transmission policy. The transmissions sent according to the second transmission policy can be more reliable (e.g., experience less errors compared to transmissions sent according to the first transmission policy). Thus, a need for error correction transmission policies can be altered.

Figure 8:
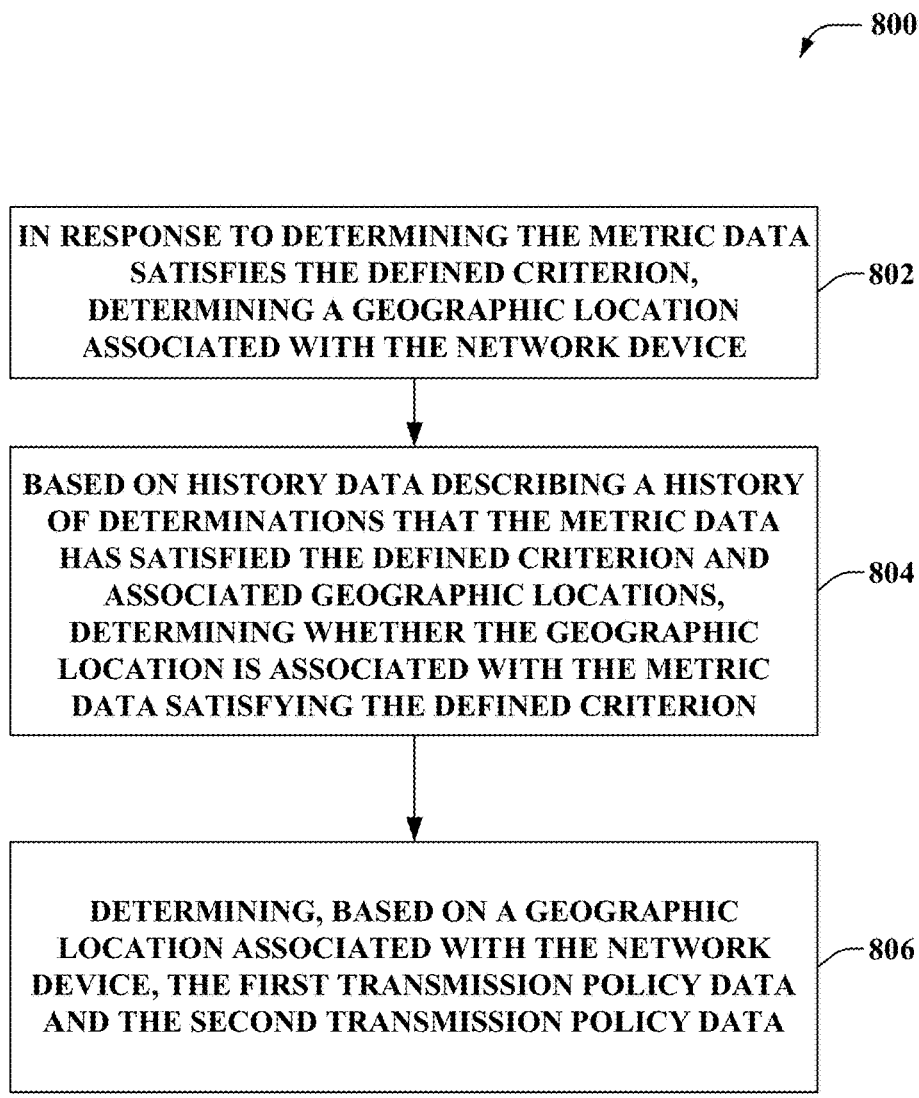
FIG. 8 illustrates a flow diagram of an example, non-limiting embodiment of a method for reducing latency in a system including determining a geographic location associated with a user equipment device, as described herein.

Turning now to FIG. 8, illustrates a flow diagram of an example, non-limiting embodiment of a method 800 for latency reduction based on altering a transmission policy as a function of a signal metric, including determining a geographic location associated with a user equipment device.

At 802, a system can, in response to determining the metric data satisfies the defined criterion, determine (e.g., using geographic location component 230) a geographic location associated with the network device. The geographic location can represent a geographic location of a user equipment device at or about the time that the signal metric meets the defined criterion. In an aspect, the geographic location can comprise coordinates on a map, an area of a map, and the like. It is noted that the system can determine the geographic location based on data received from a global positioning satellite system, triangulation, available wireless networks, and the like.

At 804, a system based on history data describing a history of determinations that the metric data has satisfied the defined criterion and associated geographic locations, determine whether the geographic location is associated with the metric data satisfying the defined criterion. In embodiments, the system can analyze past occurrences of signal metrics meeting the defined criterion and associated geographic locations of user equipment devices that experienced the occurrences. In some embodiments, the system can also utilize data describing the user equipment devices (e.g., make, model, operating system, etc.) and can determine identifiable correlations between the data describing user equipment devices, geographic locations, and the occurrences.

At 806, a system can determine, based on a geographic location associated with the network device, the first transmission policy data and the second transmission policy data. It is noted that the system can determine to utilize the first or second transmission policy based on the geographic location without determining if the signal metric meets a defined criterion. For example, if the system has identified a correlation between a geographic location and a decrease in signal strength, the system can utilize the correlation to select a transmission policy.

Figure 9:
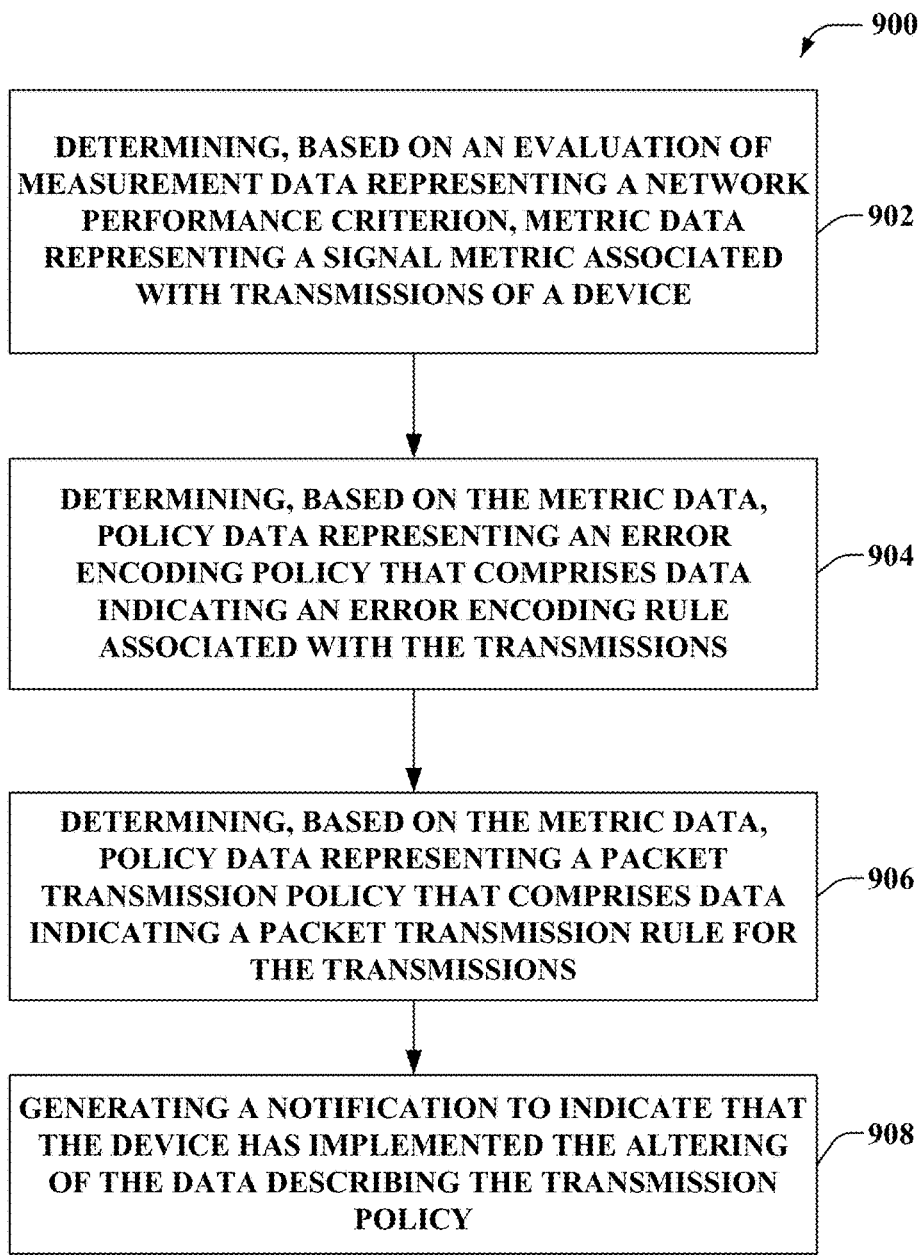
FIG. 9 illustrates a flow diagram of an example, non-limiting embodiment of a method for reducing latency in a system including generating a notification indicating that a transmission policy is altered, as described herein.

Turning now to FIG. 9, illustrates a flow diagram of an example, non-limiting embodiment of a method 900 for latency reduction based on altering a transmission policy as a function of a signal metric, including altering data that instructs a user device to alter transmission parameters.

At 902, a system can determine (e.g., using network monitor component 110), based on an evaluation of measurement data representing a network performance criterion, metric data representing a signal metric associated with transmissions of a device.

At 904, a system can determine based on the metric data, policy data representing an error encoding policy that comprises data indicating an error encoding rule associated with the transmissions.

At 906, a system can determine (based on the metric data, policy data representing a packet transmission policy that comprises data indicating a packet transmission rule for the transmissions.

At 908, a system can generate a notification to indicate that the device has implemented the altering of the data describing the transmission policy. In some embodiments, the system can generate the notification as an audio or visual notification. An audio or visual notification can comprise a rendered graphical image on a graphical user interface, actuation of a light emitting diode, an audible signal, a vibration, and the like. In other embodiments, the system can generate the notification as a signal. For example, the system can generate a signal that notifies a base station device of the alteration.

Figure 10:
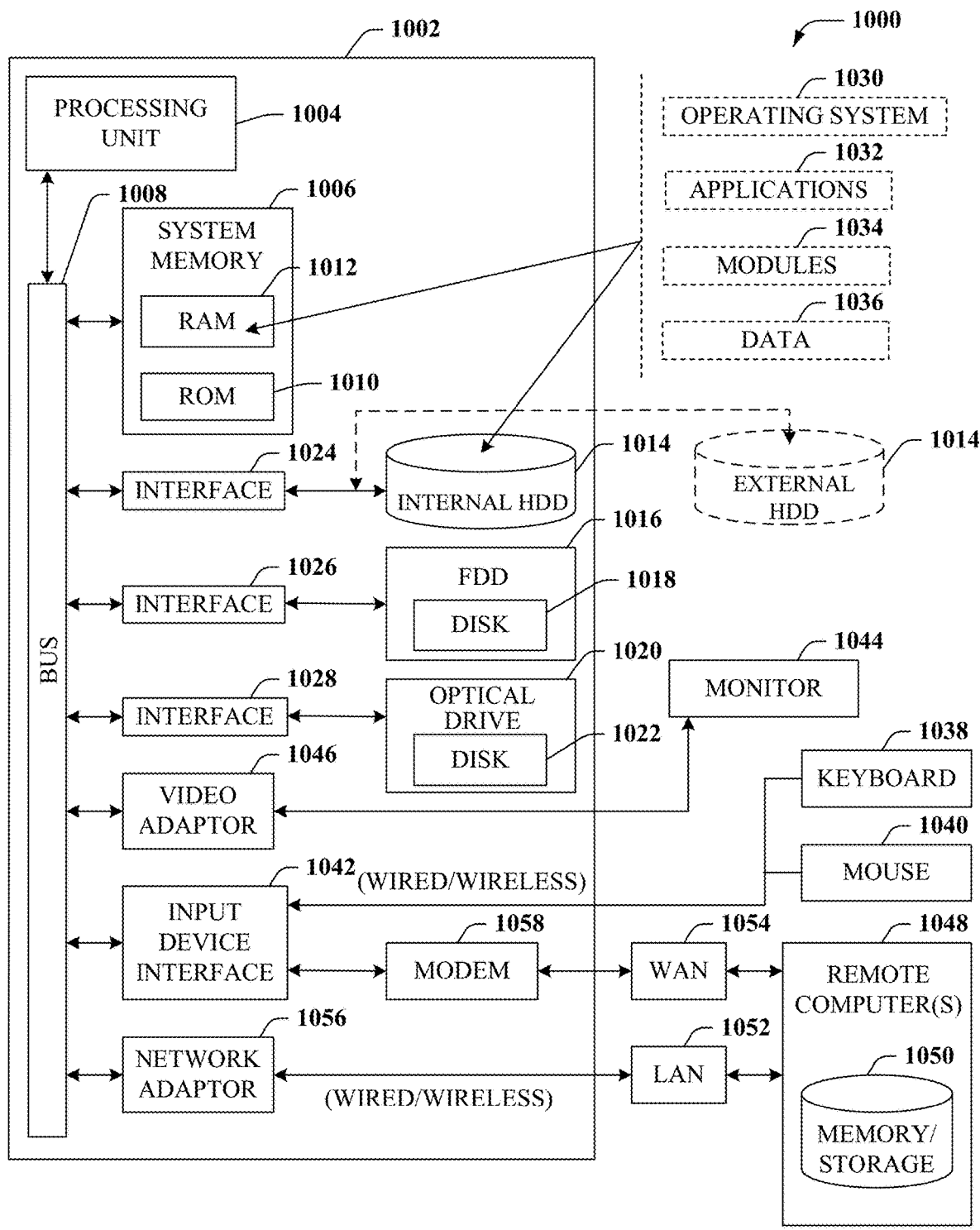
FIG. 10 is a block diagram of an example, non-limiting embodiment of a computing environment in accordance with various aspects described herein.

Referring now to FIG. 10, there is illustrated a block diagram of a computing environment in accordance with various aspects described herein. For example, in some embodiments, the computer can be or be included within a latency reduction and range extension system disclosed in any of the previous systems 100, 200, 300, 400, 500, 600, 700, 800, and/or 900.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage such as holographic memories and blu-ray discs, delay lines, memresitors, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004 that can, for example, be hardware, software, firmware or some combination.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD, Blu-ray, and the like). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation device, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station device. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 11BaseT wired Ethernet networks used in many offices.

Figure 11:
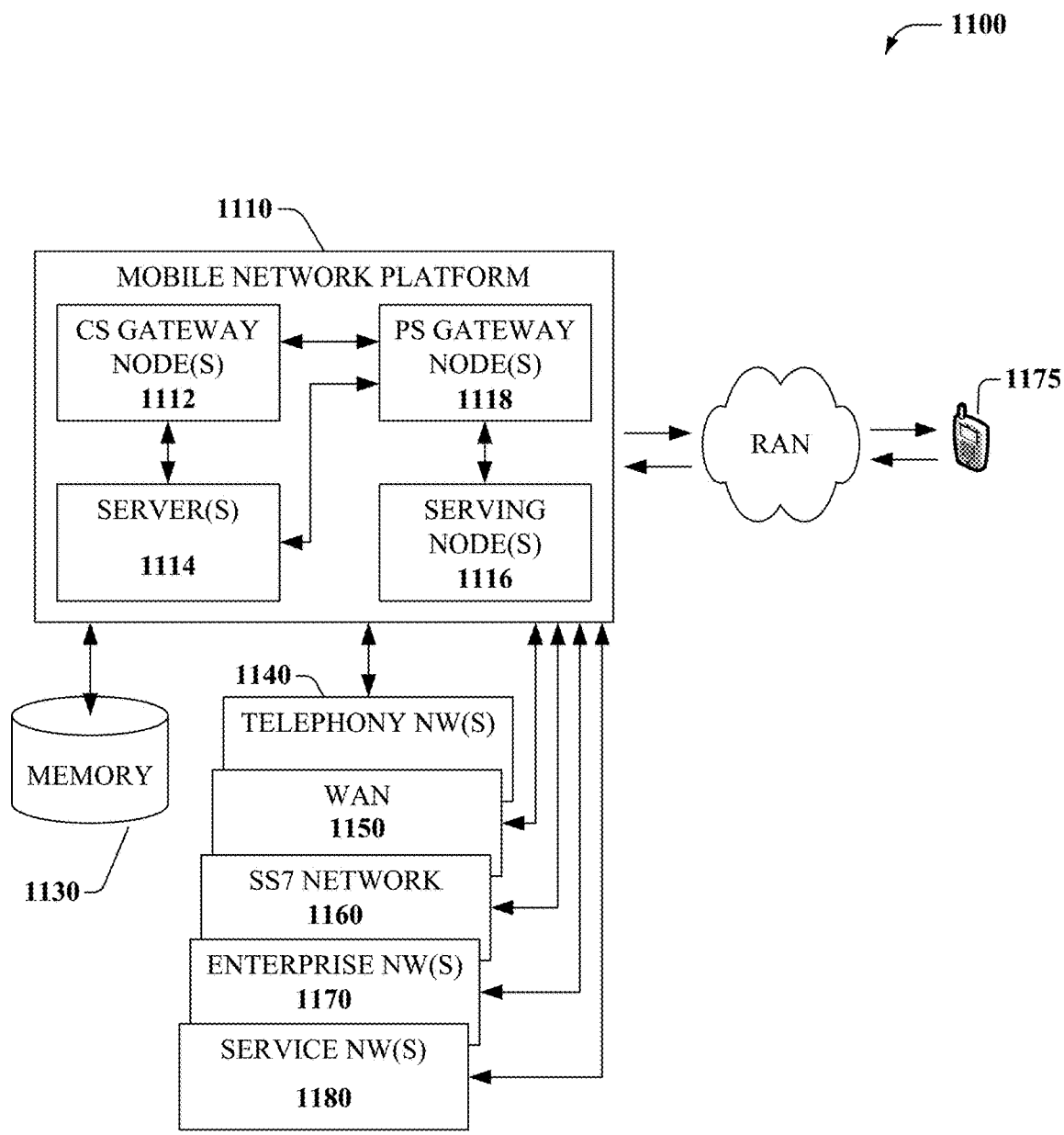
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150, Global Positioning System (GPS) network(s), Global Navigation Satellite Systems (GLONASS), and the like. Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ computational inelegance (e.g. artificial intelligence, neural networks, etc.) to facilitate automating one or more features described herein. The embodiments (e.g., in connection with automatically identifying acquired cell sites that provide a maximum value/benefit after addition to an existing communication network) can employ various computational inelegance based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers, such as neural networks, that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station device," "mobile," subscriber station device," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, memristors, optical sources, detectors, passive optical components, non-passive optical components, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), memristors, electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the disclosed embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        in response to determining that a first user equipment, which belongs to a defined category of devices, is predicted to be located within a geographical area, determining correlation data representing a correlation between the defined category and the geographical area, wherein the correlation data is determined based on historical data indicative of a signal metric, associated with signals transmitted between at least one second user equipment and an access point device that serves the geographical area, satisfying a defined criterion with respect to a threshold quantity of occurrences, and wherein the at least one second user equipment is determined to belong to the defined category; and
        based on the correlation data, altering policy data representing a transmission policy that facilitates a transmission of a data packet between the access point device and the first user equipment.

2. The system of claim 1, wherein the altering the policy data results in altered policy data and the operations further comprise:
    based on the altered policy data, facilitating the transmission of the data packet.

3. The system of claim 1, wherein the defined category is defined by a particular device make of the first user equipment.

4. The system of claim 1, wherein the defined category is defined by a particular device model of the first user equipment.

5. The system of claim 1, wherein the defined category is defined by a particular battery power level.

6. The system of claim 1, wherein the policy data is associated with an error correction policy.

7. The system of claim 1, wherein the altering comprises modifying a transmission power employable to transmit the data packet.

8. The system of claim 1, wherein the altering comprises modifying a number of error correction bits that are to be transmitted per data packet.

9. The system of claim 1, wherein the altering comprises a length of time for a data transmission associated with the first user equipment.

10. A method, comprising:
    in response to determining that a first user equipment, which belongs to a defined category of devices, is located within a geographical area, determining, by a system comprising a processor, correlation data representing a correlation between the defined category and the geographical area, wherein the determining the correlation data comprises determining the correlation data based on historical data indicative of a signal metric, associated with signals transmitted between at least one second user equipment and an access point device that serves the geographical area, satisfying a defined function with respect to a threshold frequency of occurrences, and wherein the at least one second user equipment is determined to belong to the defined category; and
    based on the correlation data, updating, by the system, policy data representing a transmission policy that is utilized to transmit a data packet between the access point device and the first user equipment.

11. The method of claim 10, wherein the determining that the first user equipment is located within the geographical area comprises determining that the first user equipment is located within the geographical area based on accelerometer data received from an accelerometer of the first user equipment.

12. The method of claim 10, wherein the determining that the first user equipment is located within the geographical area comprises determining that the first user equipment is located within the geographical area based on global position satellite data associated with the first user equipment.

13. The method of claim 10, wherein the defined category is defined by a particular device make of the first user equipment.

14. The method of claim 10, wherein the defined category is defined by a particular device model of the first user equipment.

15. The method of claim 10, wherein the defined category is defined by a particular battery power level.

16. The method of claim 10, wherein updating the policy data comprises updating policy data representing an error correction policy associated with a transmission of the data packet.

17. A non-transitory machine-readable medium, comprising executable instructions that, when executed by a processor of a system, facilitate performance of operations, comprising:
    in response to verifying that a first user equipment, belonging to a defined category of devices, is located within a geographical area, determining correlation data representing a correlation between the defined category and the geographical area, wherein the correlation data is determined based on historical data indicative of a signal metric associated with signals transmitted between at least one second user equipment and an access point device that serves the geographical area, satisfying a defined criterion that is a function of a threshold quantity of times, and wherein the at least one second user equipment is determined to belong to the defined category; and based on the correlation data, updating policy data representing a transmission policy that is utilized to transmit a data packet between the access point device and the first user equipment.

18. The non-transitory machine-readable medium of claim 17, wherein updating the policy data comprises updating an error correction policy associated with a transmission of the data packet.

19. The non-transitory machine-readable medium of claim 17, wherein the defined category is defined by a particular device model.

20. The non-transitory machine-readable medium of claim 17, wherein the defined category is defined by a particular a device manufacturer.

* * * * *